US012146462B2

(12) United States Patent
Pirkl et al.

(10) Patent No.: US 12,146,462 B2
(45) Date of Patent: Nov. 19, 2024

(54) VALVE OF A FUEL INJECTOR

(71) Applicant: LIEBHERR-COMPONENTS DEGGENDORF GMBH, Deggendorf (DE)

(72) Inventors: Richard Pirkl, Regensburg (DE); Razvan-Sorin Stinghe, Hengersberg (DE); Martin Seidl, Deggendorf (DE)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 831 days.

(21) Appl. No.: 17/271,698

(22) PCT Filed: Sep. 12, 2019

(86) PCT No.: PCT/EP2019/074420

§ 371 (c)(1),
(2) Date: Feb. 26, 2021

(87) PCT Pub. No.: WO2020/053359

PCT Pub. Date: Mar. 19, 2020

(65) Prior Publication Data

US 2021/0254590 A1 Aug. 19, 2021

(30) Foreign Application Priority Data

Sep. 12, 2018 (DE) ..................... 10 2018 122 250.5

(51) Int. Cl.
*F02M 63/00* (2006.01)

(52) U.S. Cl.
CPC .... *F02M 63/0075* (2013.01); *F02M 63/0019* (2013.01)

(58) Field of Classification Search
CPC ........... F02M 63/0075; F02M 2200/02; F02M 2200/26; F02M 63/0019
See application file for complete search history.

(56) References Cited

U.S. PATENT DOCUMENTS 4,978,074 A * 12/1990 Weinand ................ F02M 67/12 251/129.18
5,169,066 A * 12/1992 Ricco ................. F02M 63/0075 239/96

(Continued)

FOREIGN PATENT DOCUMENTS

DE 10118161 A1 10/2002
DE 10118162 A1 10/2002

(Continued)

OTHER PUBLICATIONS

The Engineering ToolBox (2003). Young's Modulus, Tensile Strength and Yield Strength Values for some Materials. [online] Available at: https://www.engineeringtoolbox.com/young-modulus-d_417.html [Accessed Apr. 15, 2024]. (Year: 2003).*

*Primary Examiner* — Cody J Lieuwen
(74) *Attorney, Agent, or Firm* — Dilworth & Barrese, LLP

(57) ABSTRACT

The present invention relates to a valve of a fuel injector for selectively disconnecting a high pressure region from a low pressure region of a fuel, comprising an opening in a seat plate, an armature which is designed to close the opening of the seat plate, a spring element which prestresses the armature in the direction of a position which closes the opening, and an electromagnet for lifting the armature out of the position which closes the opening into a position which releases the opening, characterized by an elastically compressible damping element for limiting an armature stroke in the case of the armature being lifted from the seat plate into the releasing position.

21 Claims, 2 Drawing Sheets

(56) References Cited

U.S. PATENT DOCUMENTS

| | | | | |
|---|---|---|---|---|
| 5,238,224 | A * | 8/1993 | Horsting | F02M 51/005 251/129.15 |
| 6,254,200 | B1 | 7/2001 | Ganzel | |
| 2003/0226914 | A1 * | 12/2003 | Mills | F02M 61/166 239/585.4 |
| 2013/0270370 | A1 * | 10/2013 | Kondo | F02M 63/0019 239/589 |
| 2014/0203112 | A1 * | 7/2014 | Holtman | F02M 47/027 239/585.1 |
| 2014/0367595 | A1 * | 12/2014 | Miura | F16K 31/0689 251/64 |
| 2019/0368457 | A1 * | 12/2019 | Endo | F02M 21/0266 |
| 2019/0390790 | A1 | 12/2019 | Nakagawa | |
| 2020/0240366 | A1 * | 7/2020 | Schüle | F02M 61/042 |

FOREIGN PATENT DOCUMENTS

| | | | |
|---|---|---|---|
| DE | 10256948 | A1 | 6/2004 |
| EP | 0483769 | A1 | 5/1992 |
| EP | 1970557 | A2 | 9/2008 |
| JP | WO2017/158788 | A1 | 9/2017 |

* cited by examiner

VALVE OF A FUEL INJECTOR

BACKGROUND OF THE INVENTION

The present invention relates to a valve of a fuel injector. Fuel injectors, that are also called injection valves, are an essential component of every internal combustion engine since the required quantity of combusting fuel is introduced into the combustion chamber via them. It is of great importance for a clean combustion here to maintain an opening and closing of the injector that is as fast as possible over the total service life of an injector to be able to continuously supply an exact quantity of a fuel.

The skilled person is aware that a valve that separates a high pressure region of the fuel from a region with low pressure is present for a transition from a closed state of the injector into an open state. If the regions are connected to one another in that the valve moves into its open position, this results in an injection procedure of fuel by the injector via a hydraulically mechanical event chain.

A magnetic valve is typically used in accordance with the prior art here. In a closed state, a magnetizable part, the armature, guided in a guide is acted on by means of a spring element by a preload force that urges the armature away from the magnet in an axial direction toward a seat plate that has an opening. The armature closes the opening by the urging of the armature toward the seat plate so that a connection of the high pressure region and the low pressure region of the fuel that extends through the opening is closed. This is typically achieved in that a sealing plate of the armature facing the seat plate closes the opening in the seat plate so that the region of high pressure is separated from a region of low pressure. The region of high pressure here corresponds to the system pressure at which the fuel is injected into the combustion chamber. The region of lower pressure here corresponds to the tank pressure or also to the environmental pressure.

In an open state, the connection between the high pressure region and the low pressure region via the opening in the seat plate is released by an axial movement of the armature in the direction of the magnet so that fuel can flow from the high pressure region into the low pressure region. At least one fuel inlet from the injector into the combustion chamber is released via the already briefly mentioned hydraulically mechanical event chain so that fuel enters into the combustion space.

On the raising of the armature from the closed state into the open state, it is customary in accordance with the prior art that the armature abuts an abutment surface of the magnet and in so doing bumps against the abutment surface, which causes high wear of the armature. The bumping is also further disadvantageous because the bumping greatly impairs the switching times of the armature.

SUMMARY OF THE INVENTION

It is accordingly the objective of the invention to minimize the armature bumping on the abutment of the armature at the magnet so that the accompanying disadvantages can be alleviated or overcome.

This is done with the aid of a valve of a fuel injector that has the features of the description herein. Advantageous embodiments of this valve can also be found in the description herein.

In accordance with the invention the valve of a fuel injector for the selective separation of a high pressure region from a low pressure region of a fuel comprises an opening in a seat plate, an armature that is configured to close the opening of the seat plate, a spring element that preloads the armature in the direction of a position closing the opening, and an electromagnet for raising the armature from the position closing the opening into a position releasing the opening. The valve in accordance with the invention is characterized in that it furthermore comprises an elastically compressible damping element to bound an armature stroke on the raising of the armature from the seat plate into the releasing position.

This elastically compressible damping element accordingly damps the movement of the armature on an activation of the magnet and a drawing of the armature away from the opening that results therefrom so that bumping between the magnet and the armature is avoided or alleviated.

It is advantageous here for the damping element to be a soft-elastic damping element. As will be shown later with reference to the description of the Figures, a soft-elastic design of the damping element with respect to the oscillating vibration movement of the armature that results on an impact on the damping element with a continuous magnetic force of attraction away from the opening is particularly well suited to suppress the oscillating vibration.

In accordance with an optional modification of the present invention, the stiffness of the damping element is smaller than the stiffness of the armature.

Provision can furthermore be made in accordance with the invention that the damping element is a damping pin having a substantially cylindrical shape that preferably has a cross-sectional reduction between its two end surfaces. One of the two end surfaces is configured to serve as an abutment surface for the armature. Provision can be made with the other of the two end surfaces that the pin is arranged in a cutout of the magnet. The cross-sectional reduction can here represent a groove that runs around the outer circumference of the pin and that preferably runs completely around the outer circumference. Provision can be made for an improved long-term durability that the circumferential groove has an arcuate form viewed in cross-section that is rounded at the groove transitions.

In accordance with a further optional modification of the invention, the damping element has a spherical section at its contact surface to the armature to minimize a contact surface with the armature.

On the one hand, a small contact surface with the armature is thereby produced, which is desirable with respect to a remanence force of the magnet that is smaller by as much as possible. It is advantageous here that the magnetic flux over the contact surface is as small as possible. On the other hand, it is advantageously achieved by the spherical contact surface that, with an oblique position of the damping element due to tolerances, a contact surface that is always the same acts between the damping element and the armature.

Provision can furthermore be made that the poles of the electromagnet and the end side of the damping element contacting the armature are disposed in a common plane in a relaxed state of the damping element. In other words, the end sections of the poles facing the armature and the end side of the damping element contacting the armature are arranged in a common plane when the armature is in its relaxed condition and is not attracted by the magnet.

In accordance with a further development of the invention, the damping element is separate from a housing of a fuel injector. Provision can thus be made that the damping element is mounted and is held in position by a press fit. The press fit can be implemented, for example in that a cutout is provided in the magnet in which the damping element is accommodated.

Provision can furthermore be made in accordance with the invention that the preload force of the spring element can be set, preferably via setting plates to change the position of the spring element with respect to the damping element and/or the armature. The spring preload force can thus be set exactly and indeed also on a presence of an unwanted deviation of the spring force from the expected spring force.

In accordance with a further development of the invention, the end side of the damping element remote from the armature is designed as a flat seat. Provision can be made here that the flat seat is arranged in the magnet.

In accordance with an optional modification of the present invention, the armature has an elevated portion in its surface facing the damping element at which the armature impacts the damping element. A spacing can therefore thus be provided under certain circumstances in the attracted state, that is when the magnet is active and the armature is in the releasing position, between the pole cores of the magnet and an end side of the armature not provided with an elevated portion. This prevents the contact between the armature and the magnet.

The armature can furthermore be designed in multiple parts so that it comprises an armature part and a seat part or consists of these parts.

In accordance with a further preferred embodiment of the invention, the spring element is a spiral spring that preferably extends in a spiral manner around the damping element or winds around the damping element in a spiral manner. The damping element is therefore partially or completely received in the space bounded by the spiral shape of the spring element.

Provision can furthermore be made in accordance with the invention that the armature only comes into contact with the damping element on the transition from the position closing the opening into the position releasing the opening. In a still sealing state, a sealing surface of the armature naturally contacts the seat plate and also the spring element that exerts a spring force exerted in the direction of the opening. However, no direct contact arises between the magnet or an abutment surface formed by the magnet.

Provision can further be made that the design of the valve is rotationally symmetrical or revolutionarily symmetrical to an axis of rotation that is preferably identical to an axis of rotation of the damping element.

The invention additionally relates to a fuel injector having a valve in accordance with a variant listed above, in particular a diesel fuel injector.

it is possible with the aid of the above-described invention to reduce the armature bumping on the abutment of the armature at the magnet and to thereby achieve a more stable injection amount regulation. The smaller armature bumping further permits the setting of a smaller armature stroke so that the armature has less impulse on an impact on the damping element, whereby the problem of armature bumping can again be alleviated. These positive effects have the result that a smaller scattering of the injection amount can be achieved between the different injectors and between different injection procedures of an injector. Finally, it is possible with the aid of the present invention to accelerate the switch-off times of the magnetic valve due to the smaller remanence force between the armature and the contact at the damping element. This is due to the fact that a smaller magnetic flux runs through the damping element due to a reduced contact surface between the damping element and the armature than would be the case with a larger contact surface such as is typically found in the prior art.

BRIEF DESCRIPTION OF THE DRAWINGS

Further features, details and advantages of the invention will be explained with reference to the following description of the Figures. There are shown.

DESCRIPTION OF THE PREFERRED EMBODIMENTS

Figure 1:
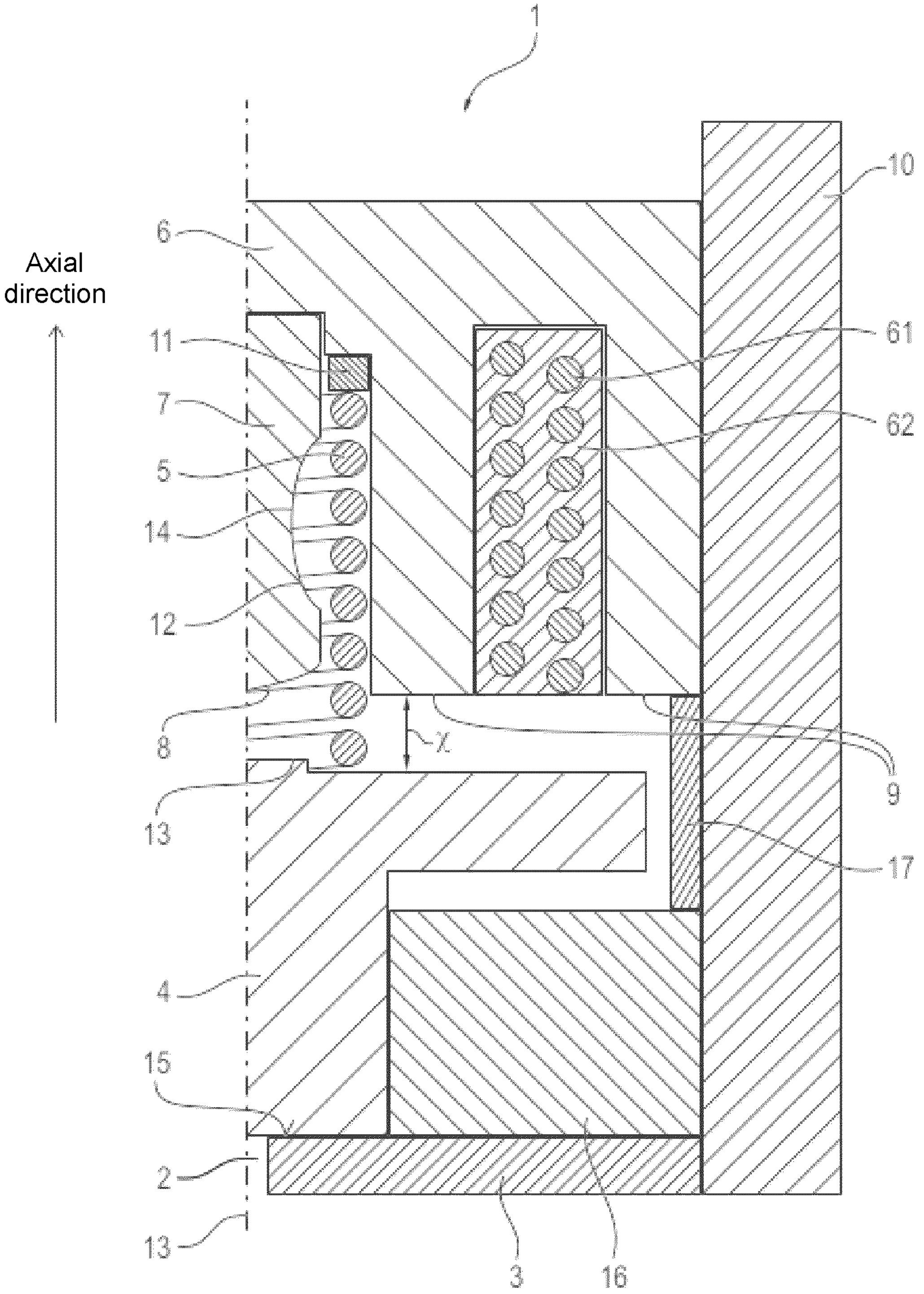
FIG. 1: a half-sectional view through the valve in accordance with the invention.

FIG. 1 here shows a partial longitudinal sectional view of the valve 1 in accordance with the invention. The seat plate 3 that separates the high pressure region (at the lower side) from a low pressure region (at the upper side) has an opening 2 that can connect a high pressure region and a low pressure region of fuel to one another. This opening 2 is here closed by an armature 4 whose sealing surface 15 seals the opening 2 in its closed state. The armature 4 can be raised from this position when the magnet 6 is activated and thus pulls the armature 4 from the opening 2. In a deactivated state of the magnet 6, a spiral spring 5 has the effect that the sealing surface 15 of the armature 4 is pressed toward the opening 2. The magnet 6 has a coil 61 and a coil jacket 62 so that a magnetic force can be produced by a flowing of current through the coil 61. In the space bounded by the spiral spring 5, a damping element 7 is arranged that corresponds to a damping pin in the representation shown. This damping pin 7 has a first end side 8 that faces the armature 4. The end side 8 is rounded in the present case or corresponds to a section of a sphere so that on an impact of the armature 4 on the damping element 7, only a contact region that is as small as possible is produced between the armature 4 and the damping element 7. It can further be recognized that the damping element 7 has a cutout 14 in its periphery that provides a smaller stiffness and thus a certain elasticity of the damping element 7. This cutout 14 can be provided as rounded here as can be seen at reference numeral 12. The damping element 7 can be held in the magnet 6 by a press fit. A setting plate 11 by which the spring can be moved in its position in the axial direction can further be provided to set the preload force of the spring element 5.

The armature 4 can here have an elevated portion at which the armature 4 impacts the contact surface 8 of the damping element 7.

An armature guide 16 is provided so that the armature is guided into the position releasing the opening 2 during a transition of its sealing position. A spacer ring 17 here screens the armature 4 from the housing 10 of a fuel injector. The magnet poles of the magnet 6 are marked by reference numeral 9.

The axis of symmetry 13 shows that the valve 1 is set up with mirror symmetry and/or rotational symmetry.

In a closed state, a magnetizable part, here the armature 4, is acted on in the armature guide 16 by means of the spring element 5 by a force, the preload force, definable via the setting plate 11 that closes the armature 4 in an axial direction away from the magnet 6 toward a sealing part of the seat plate 3. As stated, the seat plate 3 separates a high pressure region from a low pressure region of the fuel.

In an open state, the connection between the high pressure region and the low pressure region via the opening 2 in the seat plate 3 is released by an axial movement of the armature 4 in the direction of the magnet 6 so that fuel can flow from the high pressure region arranged at the bottom in FIG. 1 into the low pressure region that is arranged above the seat plate 3 in FIG. 1. At least one fuel inlet from the injector into the combustion chamber is released via a hydraulically mechanical event chain and fuel is supplied into the combustion space.

Current that flows through the windings of the coil 61 is produced by means of a voltage source to open the magnetic valve 1, that is the transition between a closed state and an open state. The windings of the coil 61 are surrounded by a coil jacket 62 that is in turn surrounded radially inwardly and outwardly by a ferromagnetic core 6 that serves for the reinforcement of the magnetic field induced by the current in the coil 61.

A force acts between the magnet pole 9 of the magnet 6 and the armature 4 due to the magnetic field. With a sufficiently strong power signal and a sufficiently long control duration, the attractive magnetic force between the magnet pole 9 and the armature 4 exceeds the opposite preload force of the spring 5. As a result, the armature is then drawn in the axial direction in the direction of the magnet 6 so that the opening 2 in the seat plate 3 is released.

The armature 4 is constantly further accelerated by the attractive magnetic force increasing as the distance reduces until it comes to abutment of the armature 4 at the damping element 7. In so doing, the armature 4 impacts a contact surface 8 of the damping element 7 that is configured by a pin in the above.

The damping pin 7 acts like a very hard spring, but has a comparatively small stiffness in comparison with the armature 4. Provision can be made here that the stiffness of the damping pin or of the damping element is smaller than 70%, preferably smaller than 50%, and more preferably smaller than 30%, of the stiffness of the armature 4. The damping pin 7 completely brakes the armature 4, with the damping pin 7 being elastically compressed. In so doing, there is a no further mechanical contact between the armature 4 and the magnet 6 except for the contact between the armature 4 and the pin 7.

After a maximum compression of the pin 7, the restoring force of the spring 5 and of the pin 7 effects an expansion of the pin 7 in the direction of the opening 2 of the seat plate 3. In an oscillating process, a deformation of the pin 7 is adopted to a degree at which the sum of the forces acting on the armature 4 (the attractive magnetic force and the repelling restoring force due to the spring 5 and the pin deformation) cancel each other out in force equilibrium.

The electrical current and the magnetic field are reduced again on a switching off of the voltage source. The magnetic force attracting the armature 4 thereby decreases very rapidly and can no longer overcome the restoring force of the spring. The armature is thereupon urged back into the closed state by the spring 5 so that the opening 2 in the seat plate 3 is closed by the armature 4 and the high pressure space (below the seat plate 3) is again separated from the low pressure space (above the seat plate 3) so that one or more fuel inlets from the injector into the combustion space are closed again via the hydraulically mechanical event chain and fuel is no longer introduced into the combustion space.

Figure 2:
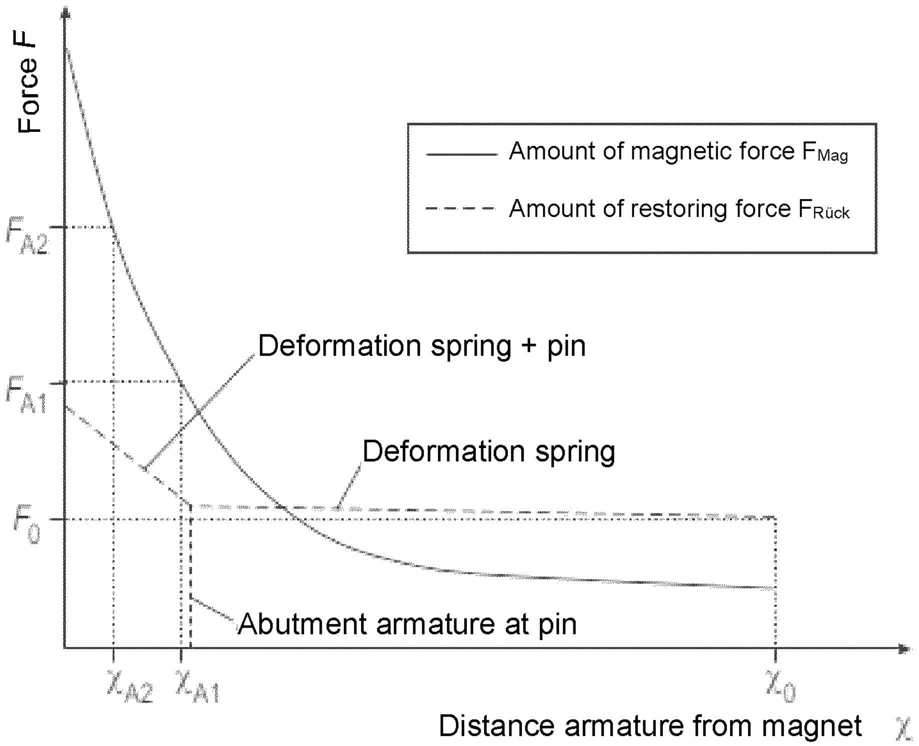
FIG. 2: a force diagram on the transition of the armature between its two positions.

As FIG. 2 shows, the implementation of the abutment of the armature 4 at the damping element 7, that is relatively soft-elastic, produces a very advantageous behavior of the armature 4. If the armature 4 impacts the damping element 7, it only oscillates at a very small oscillation amplitude for a manageable time period.

Figure 3:
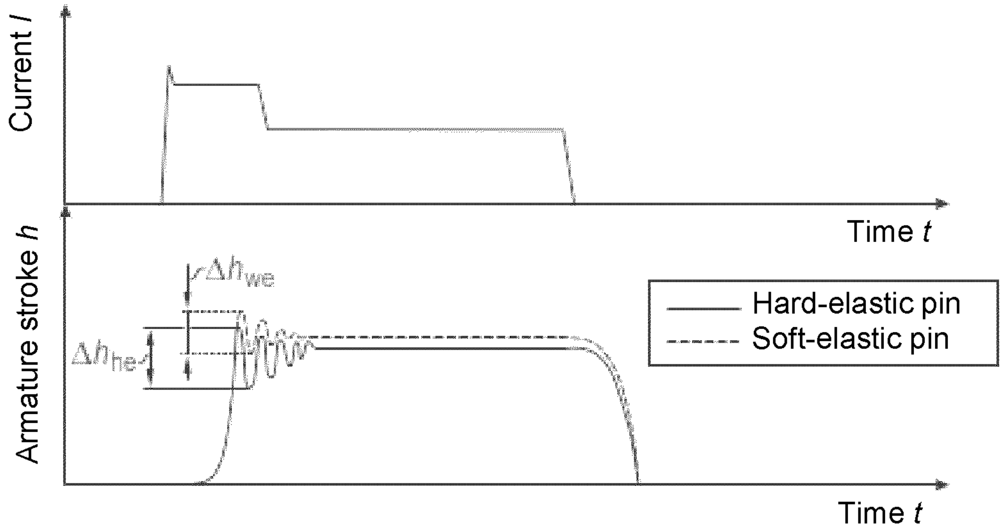
FIG. 3: a representation of the armature stroke in dependence on different elasticities of the damping element.

FIG. 3 shows this oscillation behavior of the armature with reference to the armature stroke h in comparison with different elasticities of the damping element 7. Here, a hard elasticity is shown by a continuous line whereas a soft elasticity of the damping element 7 is shown in a dashed embodiment. It can be recognized that the oscillation amplitude of the soft-elastic embodiment $\Delta h_{we}$ is smaller in the hard elastic embodiment $\Delta h_{he}$. This is due to the fact that the deformation of the damping element 7 on the impact of the armature has the result that the distance between the magnet 6 and the armature 4 is first further reduced to a distance that is smaller than that distance that would be adopted in a static equilibrium of forces. This has the result that the magnetic force $F_{Mag}$ between the armature 4 and the magnet 6 that attracts the armature 4 increases disproportionately in comparison with a linearly increased restoring force $F_{Rück}$, caused by the spring and damping element 7. The disproportionate force increase greatly damps the resilient effect of the damping element 7 so that the bumping of the armature on the abutment of the magnet is reduced.

This is shown graphically in FIG. 2 in which the continuous line represents the amount of the magnetic force $F_{Mag}$ and the dashed line represents the amount of the restoring force $F_{Rück}$. If the armature 4 is now only attracted up to the distance $X_{A1}$ in an embodiment with a hard-elastic damping element due to the magnetic force, the resulting magnetic force $F_{A1}$ is here substantially smaller than that magnetic force $F_{A2}$, that is reached on the attraction of the armature 4 up to and into the position $X_{A2}$ that results with a soft-elastic damping element embodiment.

Since, however, in the embodiment with a soft-elastic damping element, a greater force acts on the armature 4 overall than would be the case with the hard-elastic embodiment, the oscillating behavior of the armature 4 is considerably reduced that lasts for so long until a static equilibrium of forces has been adopted. A more stable regulation of the injection amount can thereby be achieved which results in an improvement of a fuel injector overall.

The invention claimed is:

1. A valve (1) of a fuel injector for a selective separation of a high pressure region from a low pressure region of a fuel, comprising:

an opening (2) in a seat plate (3);

an armature (4) configured to close the opening (2) of the seat plate (3);

a spring element (5) preloading the armature (4) in the direction of a position closing the opening (2);

an electromagnet (6) for raising the armature (4) from the position closing the opening (2) into a position releasing the opening (2); and an elastically compressible damping element (7) positioned to bound an armature stroke on raising the armature (4) from the seat plate (3) into releasing position, wherein the armature (4) is positioned to only come into contact with the damping element (7) on transition from the position closing the opening (2) into the position releasing the opening (2), the damping element (7) has a spherical section (8) at its contact surface with the armature (4) to minimize contact with the armature (4), the stiffness of the damping element (7) is smaller than the stiffness of the armature (4), and the armature (4) is spaced axially away from both the electromagnet (6) and the damping element (7) in the position closing the opening (2).

2. A valve (1) in accordance with claim 1, wherein the damping element (7) is configured to suppress oscillating vibration of the armature (4) on impact with the damping element (7) with continuous magnetic field of attraction away from the opening (2).

3. A valve (1) in accordance with claim 2, wherein the damping element (7) is configured to suppress both oscillating amplitude and duration, by increasing magnetic force ($F_{Mag}$) between the armature (4) and the magnet (6) disproportionately to restoring force ($F_{Rück}$) caused by the spring (5) and the damping element (7).

4. A valve (1) in accordance with claim 1, wherein the damping element (7) is a damping pin having a substantially cylindrical shape that has a cross-sectional reduction (12) between its two end surfaces.

5. A valve (1) in accordance with claim 1, wherein poles (9) of the electromagnet (6) and an end side of the damping element (7) contacting the armature (4) are disposed in a common plane in a relaxed state of the damping element (7).

6. A valve (1) in accordance with claim 1, wherein the damping element (7) is separate from a housing (10) of a fuel injector.

7. A valve (1) in accordance with claim 6, additionally comprising a spacer ring (17) radially positioned to separate the armature (4) from the housing (10) of the fuel injector.

8. A valve (1) in accordance with claim 1, additionally comprising a setting plate (11) arranged to set the preload force of the spring element (5) to change the position of the spring element (5) with respect to the damping element (7) and/or the armature (4).

9. A valve (1) in accordance with claim 1, wherein an end side of the damping element (7) remote from the armature (4) is designed as a flat seat.

10. A valve (1) in accordance with claim 1, wherein the armature (4) has an elevated portion (13) in its surface facing the damping element (7) at which the armature (4) impacts the damping element (7).

11. A valve (1) in accordance with claim 1, wherein the armature (4) is designed in multiple parts and comprises an armature part and a seat part.

12. A valve (1) in accordance with claim 1, wherein the spring element (5) is a spiral spring that extends in a spiral manner around the damping element (7).

13. A valve (1) in accordance with claim 12, wherein the damping element (7) extends along an axis of the valve (1).

14. A valve (1) in accordance with claim 1, wherein the design of the valve (1) is rotationally symmetrical to an axis of rotation (13) that is identical to an axis of rotation of the damping element (7).

15. A fuel injector having a valve (1) in accordance with claim 1.

16. A valve (1) in accordance with claim 1, wherein the magnet (6) has a coil (61), a coil jacket (62) surrounding the coil (61), and a ferromagnetic core (6) radially inwardly and outwardly surrounding the coil jacket (62).

17. A valve (1) in accordance with claim 1, wherein the damping element (7) is retained by the magnet (6) by a press fit.

18. A valve (1) in accordance with claim 1, additionally comprising a guide (16) positioned radially outwardly around the armature (4) to guide the armature (4) upon transition into the position releasing the opening (2).

19. A valve (1) in accordance with claim 1, wherein the stiffness of the damping element (7) is smaller than 70% of the stiffness of the armature (4).

20. A valve (1) in accordance with claim 19, wherein the stiffness of the damping element (7) is smaller than 50% of the stiffness of the armature (4).

21. A valve (1) in accordance with claim 20, wherein the stiffness of the damping element (7) is smaller than 30% of the stiffness of the armature (4).

* * * * *